United States Patent
Direnzi et al.

(10) Patent No.: US 12,398,660 B2
(45) Date of Patent: Aug. 26, 2025

(54) SYSTEMS AND METHODS FOR ATTACHMENT OF MATERIALS HAVING DIFFERENT THERMAL EXPANSION COEFFICIENTS

(71) Applicant: General Electric Company, Schenectady, NY (US)

(72) Inventors: Nicholas Direnzi, Cincinnati, OH (US); Rosa Nemec, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 17/864,029

(22) Filed: Jul. 13, 2022

(65) Prior Publication Data

US 2025/0215811 A1 Jul. 3, 2025

(51) Int. Cl.
*F01D 25/24* (2006.01)
*F16B 5/02* (2006.01)

(52) U.S. Cl.
CPC .......... *F01D 25/24* (2013.01); *F16B 5/0241* (2013.01)

(58) Field of Classification Search
CPC ........ F01D 25/24; F01D 25/243; F01D 25/26; F01D 25/28; F01D 25/30; F16B 5/0241; F02K 1/04; F02K 1/78; F02K 1/80; F02K 1/82; F02K 1/822; F02C 7/20
See application file for complete search history.

(56) References Cited

U.S. PATENT DOCUMENTS

| | | | |
|---|---|---|---|
| 3,826,088 A * | 7/1974 | Nash | C07D 277/587 |
| | | | 285/47 |
| 4,748,806 A | 6/1988 | Drobny | |
| 4,792,475 A | 12/1988 | Bien | |
| 4,971,497 A | 11/1990 | Stoffer | |

(Continued)

FOREIGN PATENT DOCUMENTS

| | | |
|---|---|---|
| EP | 2607632 | 6/2013 |
| EP | 3540314 | 9/2019 |
| WO | 2014058502 | 4/2014 |

OTHER PUBLICATIONS

USPTO; U.S. Appl. No. 17/863,993; Non-Final Office Action mailed Feb. 15, 2023; (pp. 23).

*Primary Examiner* — Woody A Lee, Jr.
*Assistant Examiner* — Cameron A Corday
(74) *Attorney, Agent, or Firm* — Wood Herron & Evans LLP

(57) ABSTRACT

An apparatus for attaching two components having different coefficients of thermal expansion includes a mounting member configured to be movably coupled relative to a first component, an attachment member opposite the mounting member and configured to be attached to a second component, and at least one support post interconnecting the mounting member and the attachment member. The apparatus also includes a backer plate including at least one aperture configured to permit at least one fastener to pass therethrough and pass through the second component and through at least one aperture in the attachment member to secure the backer plate and the attachment member to the (Continued)

second component and to attach the second component to the first component. The diameter of the aperture of the backer plate restricts the head of the fastener from passing through the aperture of the backer plate.

17 Claims, 9 Drawing Sheets

(56) References Cited

U.S. PATENT DOCUMENTS

| | | | |
|---|---|---|---|
| 5,275,529 A | 1/1994 | Langenbrunner | |
| 5,451,116 A | 9/1995 | Czachor | |
| 5,592,814 A * | 1/1997 | Palusis | F23R 3/002 |
| | | | 60/770 |
| 6,042,315 A * | 3/2000 | Miller | F16B 19/00 |
| | | | 411/908 |
| 6,773,215 B2 | 8/2004 | Cuva | |
| 8,607,577 B2 | 12/2013 | Ruberte Sanchez | |
| 9,010,027 B2 * | 4/2015 | Cooper | E05C 19/005 |
| | | | 49/506 |
| 9,255,548 B2 * | 2/2016 | Preston, III | F02K 1/80 |
| 9,341,377 B2 * | 5/2016 | Kramer | F23R 3/60 |
| 9,447,700 B2 * | 9/2016 | McMahon | F02K 1/80 |
| 9,638,133 B2 * | 5/2017 | Kramer | F02K 1/822 |
| 10,077,681 B2 * | 9/2018 | Preston | F02K 1/80 |
| 10,119,424 B2 | 11/2018 | Karafillis | |
| 10,316,695 B2 | 6/2019 | Renggli | |
| 10,422,532 B2 | 9/2019 | Sadil | |
| 10,907,508 B2 | 2/2021 | Knight | |
| 10,969,103 B2 * | 4/2021 | Chang | F23R 3/007 |
| 11,215,367 B2 | 1/2022 | Kramer | |
| 11,326,551 B1 * | 5/2022 | Sutterfield | F02K 1/52 |
| 11,788,491 B1 * | 10/2023 | Direnzi | F02K 1/80 |
| | | | 60/770 |
| 2011/0016879 A1 * | 1/2011 | Farah | F02K 1/822 |
| | | | 60/796 |
| 2013/0318979 A1 * | 12/2013 | Kramer | F02K 1/82 |
| | | | 248/342 |
| 2014/0047849 A1 * | 2/2014 | Kramer | F02K 1/82 |
| | | | 29/889.22 |
| 2014/0123678 A1 * | 5/2014 | Preston, III | F02K 1/82 |
| | | | 29/889.22 |
| 2015/0226083 A1 * | 8/2015 | Renggli | F02C 3/10 |
| | | | 415/200 |
| 2015/0322890 A1 * | 11/2015 | Lu | B23P 15/008 |
| | | | 29/889.22 |
| 2016/0326911 A1 | 11/2016 | Karafillis | |
| 2019/0078599 A1 | 3/2019 | Pinney | |
| 2019/0264923 A1 | 8/2019 | Kobayashi | |
| 2020/0291889 A1 | 9/2020 | Alloway | |

* cited by examiner ial engine, the CMC exhaust liner and the metal exhaust duct will have different amounts of thermal expansion. While fasteners have been utilized to attach CMC liners to metal exhaust ducts, such fasteners often become damaged due to the different amounts of thermal expansion.

SYSTEMS AND METHODS FOR ATTACHMENT OF MATERIALS HAVING DIFFERENT THERMAL EXPANSION COEFFICIENTS

GOVERNMENT INTERESTS

This invention was made with United States Government support under FA8650-09-D-2922 awarded by the Department of Defense. The Government has certain rights to this invention.

TECHNICAL FIELD

These teachings relate generally to jet engines and, more particularly, to attachment of aircraft engine components that have different thermal expansion coefficients.

BACKGROUND

Turbine engines, and particularly gas or combustion turbine engines, are rotary engines that extract energy from a flow of combusted gases passing through the engine onto a multitude of turbine blades. Exhaust from combustion flows through a high-pressure turbine and a low-pressure turbine prior to leaving the turbine engine through an exhaust nozzle. The exhaust gas mixture passing through the exhaust nozzle is at extremely high temperatures and transfers heat to the components of the turbine engine, including the exhaust nozzle, which is typically metallic. The high-temperature environment present within the exhaust nozzle necessitates the use of materials and components that can withstand such an environment.

BRIEF DESCRIPTION OF THE DRAWINGS

Described herein are embodiments of methods of attaching a protective liner to a metal duct of an exhaust nozzle of an aircraft engine. This description includes drawings, wherein.

Figure 1:
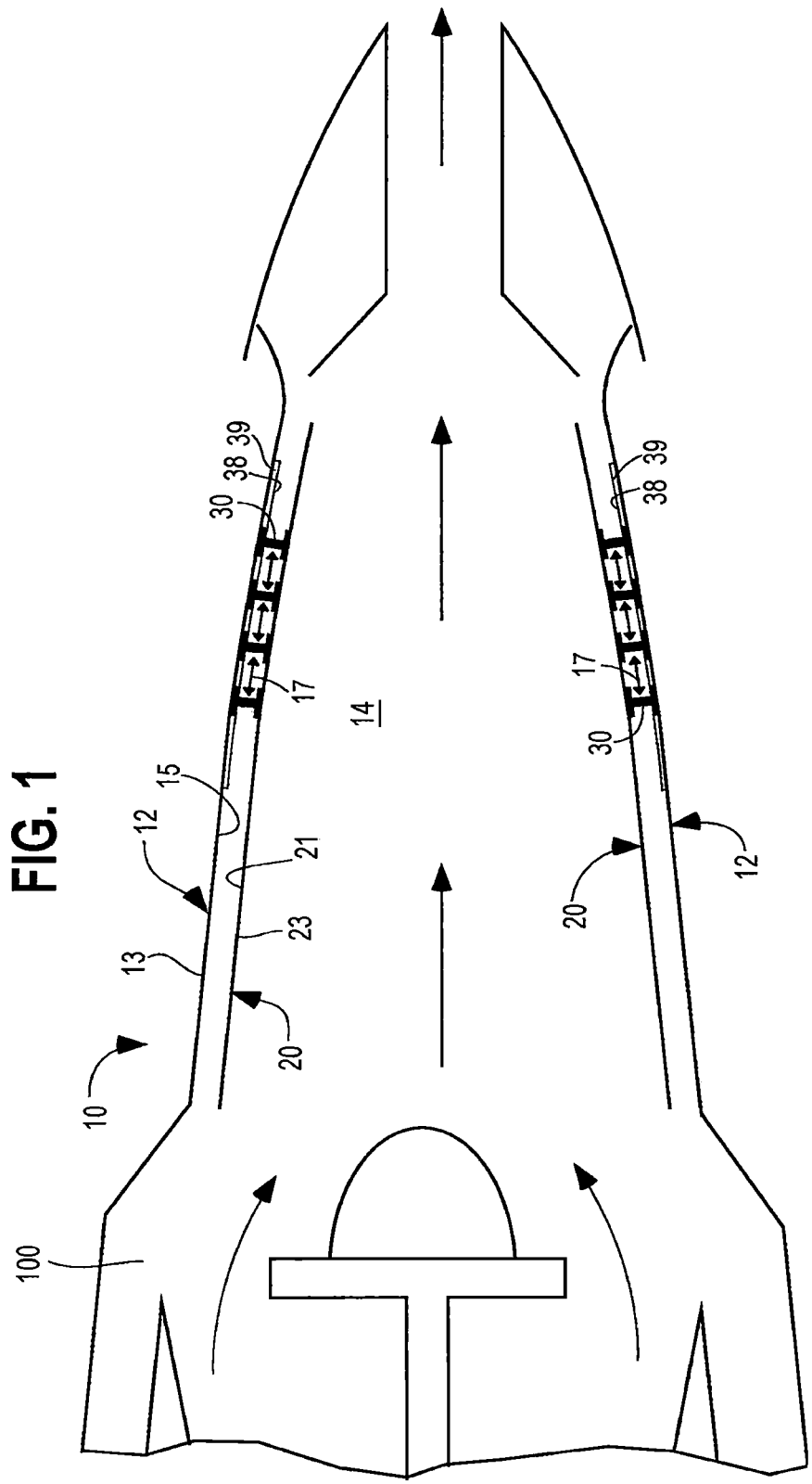
FIG. 1 is a schematic view of an exhaust nozzle of an aircraft engine including attachment apparatuses.

Elements in the figures are shown for simplicity and clarity and have not been drawn to scale. The dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 5, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Notably, the thermal expansion coefficients of the CMC exhaust liner and the typical metal exhaust duct do not closely match. As such, when exposed to the high temperature environment present in the exhaust nozzle of an aircraft engine, the metal duct expands more than the CMC exhaust liner, which can lead to undesirable results such as stress and displacements.

Notably, the thermal expansion coefficients of the CMC exhaust liner and the typical metal exhaust duct do not closely match. As such, when exposed to the high temperature environment present in the exhaust nozzle of an aircraft engine, the metal duct expands more than the CMC exhaust liner, which can lead to undesirable results such as stress and displacements.

Conventional techniques for handling the high temperatures present in/around an aircraft engine include attaching a metal exhaust protective liner directly to the metallic/non-metallic aircraft component to be protected (e.g., metallic duct of an exhaust nozzle of the aircraft engine) using bolts and formed/machined hanger systems. The thermal growth of both metal components is quite similar, which allows both components to be connected using bolts without regard for the differential in their thermal growth characteristics. Other techniques include attaching a ceramic matrix composite (CMC), a polymer matrix composite (PMC) protective to the aircraft component to be protected, since the CMC/PMC materials are lighter and is capable of withstanding higher temperatures than the typical metallic protective liner.

In the aviation industry, there is a desire for components that are made of lighter materials rather than conventional metal materials. Ceramics and their composites such as ceramic matrix composites (CMCs) provide a lightweight material option that is durable at various temperatures and thus desirable for incorporation into aircraft engines. The ceramic composite materials often need to be combined with and attached to aircraft engine components made of conventional metals. Such metal to non-metal attachments are sometimes used in high-temperature environments, for example, an exhaust nozzle of a turbofan aircraft engine.

Since the ceramic matrix composite components and the conventional metals (e.g., titanium) have different thermal expansion coefficients, the present disclosure provides a solution for attaching components of different thermal expansion characteristics to each other for use in a high-temperature environment. The solution provides an attachment apparatus that securely attaches a CMC or the like non-metallic liner to a metallic component of an aircraft engine while preventing the head of the fastener that attaches the CMC liner to the metal duct from being pulled through the CMC liner as a result of thermal expansion of the CMC liner and/or the metallic component. As such, the embodiments of the attachment apparatus described herein provide an improved and prolonged attachment of the CMC liner to the metal and protect the metal duct from deterioration and/or failing even at the high temperatures present in aircraft engines.

FIG. 1 illustrates an exemplary exhaust nozzle 10 of an exemplary aircraft engine 100. The engine 100 may be a jet engine, for example, a turbofan engine. The exemplary exhaust nozzle 10 has a generally cylindrical shape with a first component or metal duct 12 enclosing an interior 14 of the exhaust nozzle 10. In the embodiment illustrated in FIG. 1, a second component or protective liner 20 is attached to an inwardly-facing or first surface 15 of the first component 12 using a plurality of hanger-like attachment apparatuses 30, exemplary embodiments of which will be described hereinbelow.

In the exemplary embodiment depicted in FIG. 1, the second component 20 is shown as being attached to the first component 12 via eight attachment apparatuses 30 that are positioned along a portion of the second component 20 that is closer to the rear of the exhaust nozzle 10. It will be appreciated that, depending on the needs of a specific installation and the size of the exhaust nozzle 10 and/or second component 20, less than eight or more than eight attachment apparatuses 30 may be used. In addition, in some embodiments, the second component 20 may be attached to the first component 12 via two different types of attachment apparatuses, for example, the portion of the second component 20 that is closer to the rear of the exhaust nozzle 10 may be attached to the first component 12 via a suitable number (e.g., 4, 6, 8, 10, 12) of attachment apparatuses 30 as shown in FIG. 1, and the portion of the second component 20 that is closer to the front of the exhaust nozzle 10 may be attached to the first component 12 via a suitable number (e.g., 4, 5, 8, 10, 12) of different attachment apparatuses, which are described in more detail in application Ser. No. 17/863,993 entitled SYSTEMS AND METHODS FOR ATTACHMENT OF MATERIALS HAVING DIFFERENT THERMAL EXPANSION COEFFICIENTS, filed Jul. 13, 2022, which is incorporated herein in its entirety.

Figure 2:
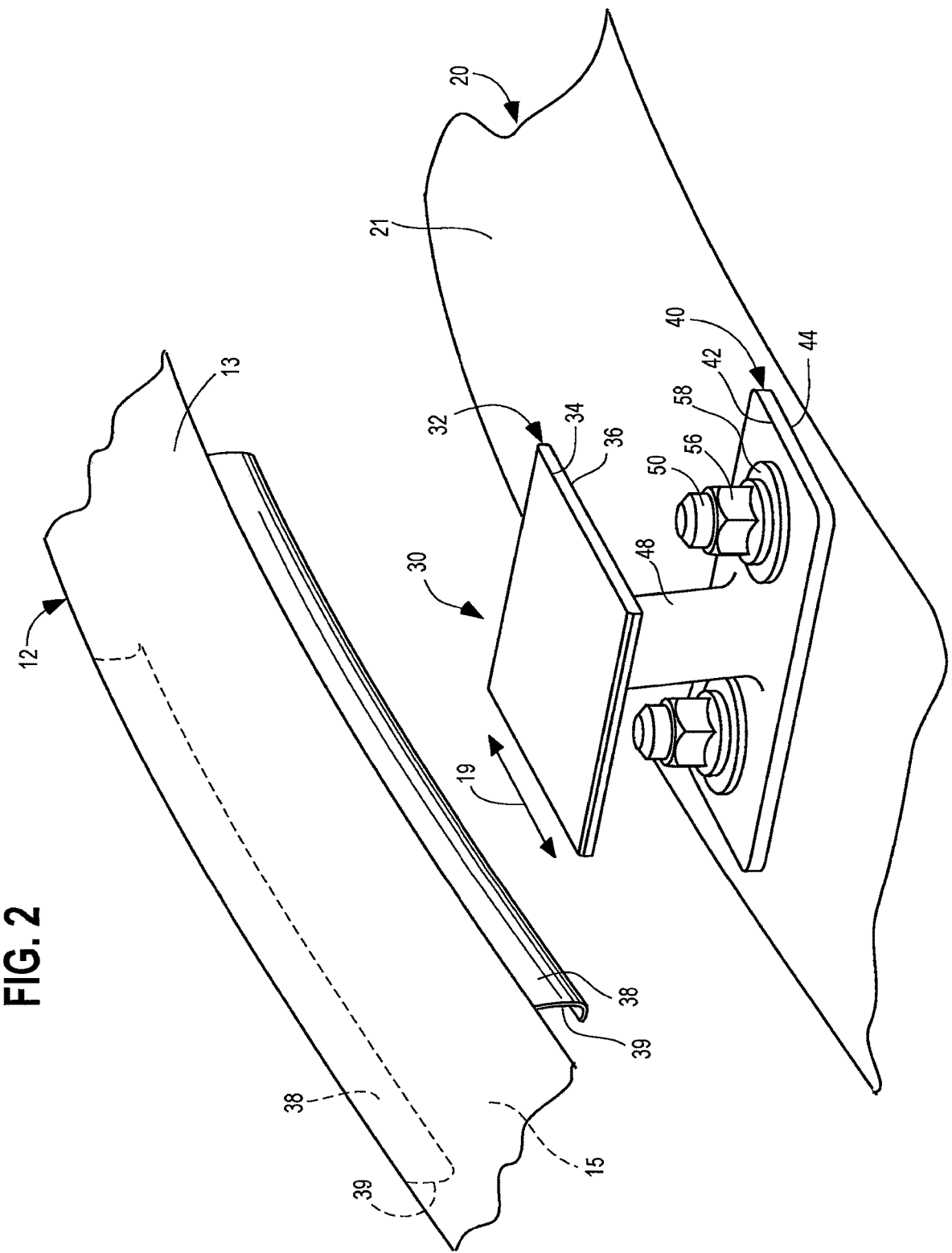
FIG. 2 is a perspective side view of an attachment apparatus that can be utilized in the aircraft engine of FIG. 1 with a section exploded.
Figure 3:
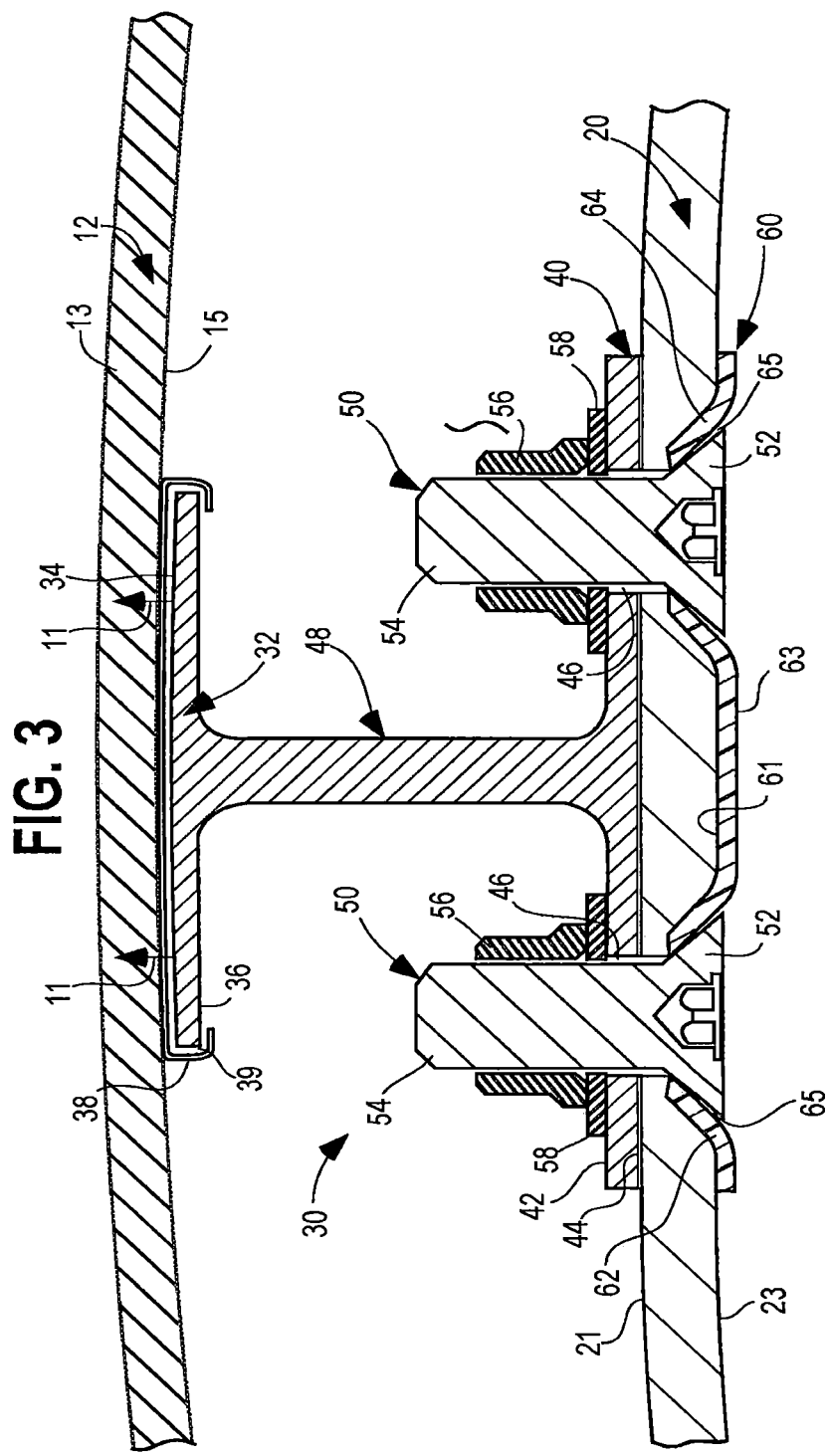
FIG. 3 is a partial cross-section elevational view of the attachment apparatus of FIG. 2.

FIGS. 2-3 illustrate an embodiment of an attachment apparatus 30 (also referred to herein as "an attachment hanger" or just "hanger") for attaching a second component 20 to a first component 12. It will be understood that the second component 20 and the first component 12 have different coefficients of thermal expansion. In non-limiting examples the second component 20 can be a CMC liner and the first component 12 can be a metal duct of an exhaust nozzle 10 of an aircraft engine. While reference is being made to attachment of a CMC liner 20 to the metal duct 12 of an exhaust nozzle 10, it will be appreciated that the CMC liner 20 is just an exemplary material that may be used as a protective liner for the metal duct 12 of the exhaust nozzle 10, and that any similar non-metallic material (e.g., polymer matrix composite (PMC) or the like) suitable for lining the interior of the metal duct 12 of the exhaust nozzle 10 by way of having suitable performance at elevated temperatures experienced in conventional or afterburning turbine exhausts for a high temperature environment such as an interior of an exhaust nozzle 10 of an aircraft engine may be used instead. By the same token, while reference is made to attachment of a protective liner 20 to a metal duct 12 of an exhaust nozzle 10 of an aircraft, it will be appreciated that the metal duct 12 of the exhaust nozzle 10 is just an exemplary first component 12 of an aircraft to which a second component 20 having a different coefficient of thermal expansion may be attached via the apparatus 30, and that the apparatus 30 may be used to attach any two components that are made of materials having different coefficients of thermal expansion.

It will be understood that components of the gas turbine engine such as the liner may comprise a composite material, such as a ceramic matrix composite (CMC) material, which has high temperature capability. As used herein, CMC refers to a class of materials that include a reinforcing material (e.g., reinforcing fibers) surrounded by a ceramic matrix phase. Generally, the reinforcing fibers provide structural integrity to the ceramic matrix. Some examples of matrix materials of CMCs can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof)

and inorganic fillers (e.g., pyrophyllite, wollastonite, mica, talc, kyanite, and montmorillonite) may also be included within the CMC matrix.

Some examples of reinforcing fibers of CMCs can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Generally, particular CMCs may be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs may be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3\ 2SiO_2$), as well as glassy aluminosilicates.

In certain embodiments, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

In the illustrated embodiment, the attachment apparatus 30 includes a mounting plate or mounting member 32 having an outwardly-facing or first surface 34 and an inwardly-facing surface or second surface 36 when mounted. The first surface 34 may be at least in part curved to complement the curvature of the first surface 15 of the first component 12.

In the embodiment shown in FIGS. 2-3, the mounting member 32 is coupled relative to the first component 12 (which may be metallic or non-metallic) via a coupling member 38 (e.g., a track, a clip, or the like) attached to the first surface 15 of the first component 12. In certain aspects, the track or clip 38 is generally C-shaped to define a channel 39 that receives at least a portion of the mounting member 32 and permits the mounting member 32 to slide axially in two directions (shown via two-directional arrows 17 in FIG. 1) therein. As such, when the second component 20 is attached to the first component 12 via the attachment apparatus 30, the slidable engagement of the mounting member 32 and the track or clip 38 attached (e.g., via welding) to the duct 12 provides some freedom of movement to the mounting member 32 within the channel 39 (in the directions indicated by the arrows 17 and 19 in FIGS. 1 and 2), advantageously accommodating for possible thermal expansion of the first component 12 and/or the second component 20. In addition, since the second component (e.g., a CMC or PMC-based material) is significantly stronger in-plane than it is through the thickness thereof, the use of the attachment apparatuses 30, 130, 230 in conjunction with the backer plates 60, 160, 260 as described herein significantly spreads out the through-thickness point load to significantly increase the ability of the second component 20 to withstand high through-thickness loads, thereby advantageously significantly reducing the chances of failure of the second component 20 even at high through-thickness loads. Furthermore, as a result of the unique configurations of the attachment apparatuses 30, 130, 230 described herein, the manufacture of the attachment apparatuses 30, 130, and 230 is advantageously simple, fast, and cost-effective.

In the non-limiting example shown in FIGS. 2-3, the attachment apparatus 30 further includes an attachment plate or member 40 opposite the mounting member 32 and a support post 48 interconnecting the mounting member 32 and the attachment member 40. Notably, while the term "plate" is use in connection with the mounting member 32 and the attachment member 40, the term "plate" as used herein may refer to any substantially flat structure or any other three-dimensional structure, and equivalents thereof, including those structures having one or more portions that are not substantially flat but curved along one or more axis. While the mounting member 32 and the attachment member 40 are interconnected by one support post 48 in the illustrated embodiment, it will be appreciated that, instead of one support post 48, any suitable number of support posts can be utilized including but not limited to two or four support posts. In some embodiments, the mounting member 32, the attachment member 40, and one or more support posts 48 may form a unitary monolithic body.

The attachment member 40 has an outwardly-facing or first surface 42 and an inwardly-facing or second surface 44. The second surface 44 may be at least in part curved to complement the curvature of the outwardly-facing surface 21 of the second component 20. The attachment member 40 further includes apertures 46 that extend through the thickness of the attachment member 40 from the first surface 42 and the second surface 44 to permit portions of fasteners 50 to pass through the attachment member 40, as shown in FIGS. 2 and 3.

Given the possible thermal expansion of the first component 12 and/or the second component 20, and since the second component 20, which could be made, for example of CMC, PMC, or the like material, would not be as strong as a metallic material would be, to prevent the heads 52 of the fasteners 50 to be pulled outwardly through the thickness of the second component 20 as a result of mechanical loads induced in operation and differences in resulting thermal expansion, the attachment apparatus 30 illustrated in FIGS. 2 and 3 advantageously includes a backer plate 60 apertures 65 configured to permit a portion (e.g., the threaded shaft of the fastener 50) to pass therethrough. In some embodiments, the backer plate 60 has an exterior profile that is contoured to match the needs of a particular installation of the attachment apparatus 30

As shown in FIG. 3, with the fasteners 50 being fully tied down, the heads 52 of the fasteners 50 securely attach the outwardly-facing or second surface 61 of the backer plate 60 to the interior-facing surface 23 of the second component 20. In addition, the shaft 54 of the fastener 50 (at least a portion of which is threaded) passes through the second component 20 and through the apertures 46 in the attachment member 40, being attached relative to the attachment member 40 by nuts 56 (which may be self-locking nuts), thereby securing both the attachment member 40 and the backer plate 60 relative to second component 20.

As shown in FIGS. 2-3, the nuts 56 may be tied onto thermal spacers 58 (through which the shaft 54 of the fastener 50 passes). Generally, the thermal spacers 58 may be made from alloys specifically selected to have a relatively high coefficient of thermal expansion to make up for the relatively low thermal expansion coefficient of the second component 20. It will be appreciated that Belleville washers may be used instead of thermal spacers 58 in certain implementations. The use of the thermal spacers 58 may accommodate for possible thermal expansion of the second component 20 and/or the fasteners 50, keeping the attachment of the backer plate 60 and the attachment member 40 to the second component 20 more secure.

In the illustrated embodiment, the backer plate 60 has a countersunk configuration that includes a first recessed portion 62 and a second recessed portion 64, as well as an inwardly-facing or first surface 63 of the backer plate 60, and the aperture 65 of the backer plate is recessed relative to the first surface 63 to form a seat for the head 52 of the fastener 50 when the fastener 50 is secured to the backer plate 60, while also securely attaching the backer plate 60 to the interior-facing surface 23 of the second component 20.

Figure 4:
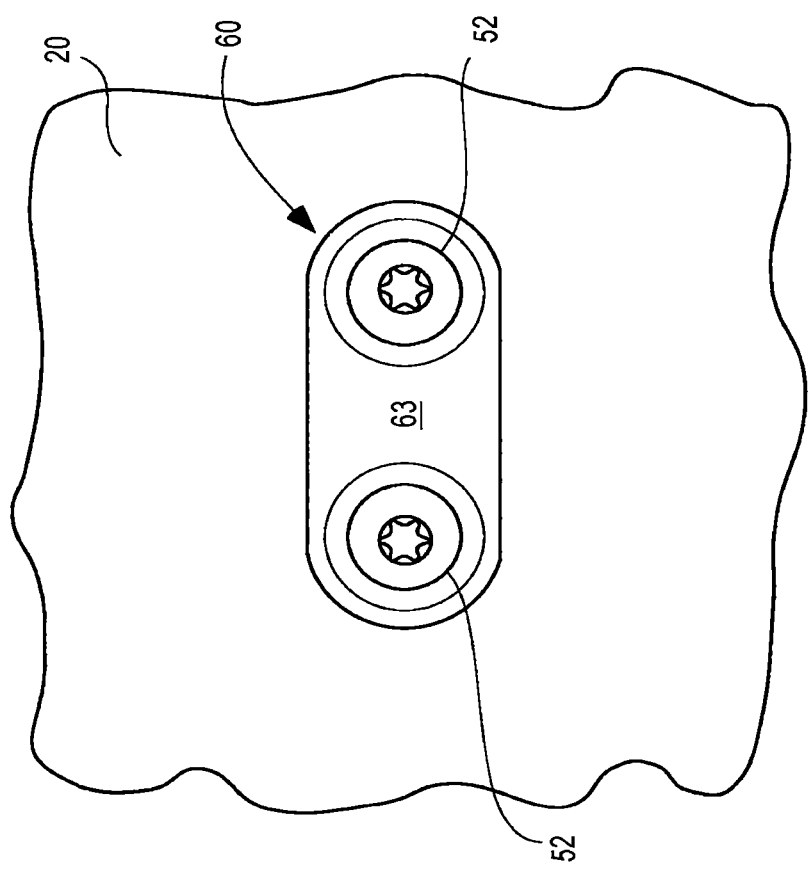
FIG. 4 is a bottom view showing an interior-facing surface of the backer plate of the attachment apparatus of FIGS. 2-3 and the heads of the fasteners that attach the backer plate to the protective liner.

The backer plate 60 may be made of a metallic or non-metallic (e.g., ceramic matrix composite, polymer matrix composite, etc.) material, which may have the same or different coefficient of thermal expansion in comparison to the second component 20. Generally, a metallic backer plate 60 would provide more forgiveness in tolerances as compared to a non-metallic (e.g., a ceramic matrix composite or a polymer matrix composite material, but would have a larger thermal growth mismatch with the second component 20 (which may be PMC or CMC) than a non-metallic (e.g., a PMC or CMC) backer plate 60. Without wishing to be limited to theory, the use of the backer plate 60 to secure the attachment member 40 of the attachment apparatus 30 to the second component 20 spreads out the through-thickness point load to increase the ability of the second component 20 to withstand high through-thickness loads, and thereby restricts/prevents the heads 52 of the fasteners 50 from being pulled through the thickness of the second component 20 in an outwardly direction even as a result of high through-thickness loads that may be incurred by the second component 20 in operation (e.g., due at least in part to thermal expansion). As can be seen in FIG. 4, the exemplary backer plate 60 may have a generally ellipsoid/oval exterior contour having curved and/or straight portions, but it will be appreciated that the backer plate 60 may be generally rectangular or circular in certain embodiments.

Figure 5:
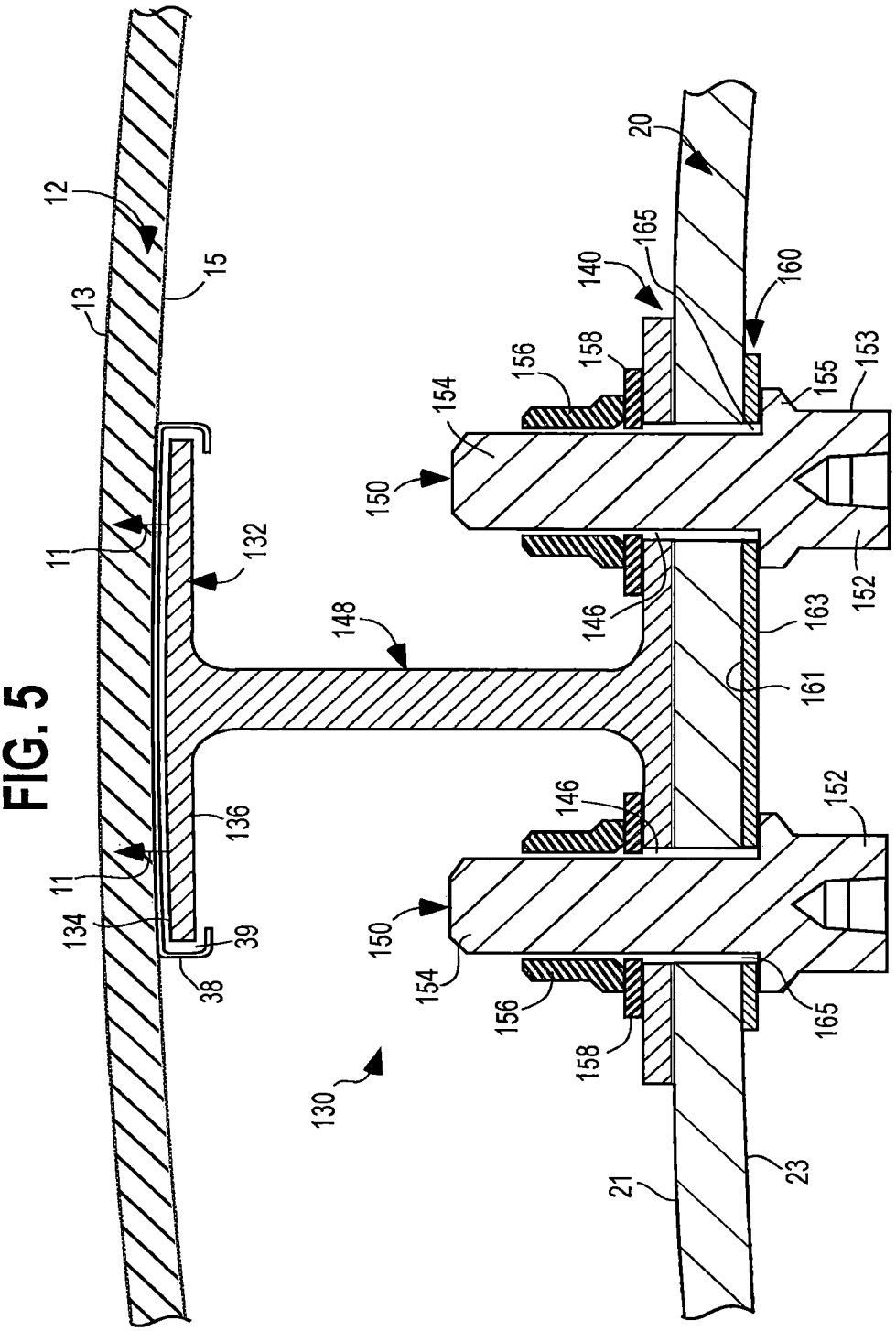
FIG. 5 is a partial cross-section elevational view of an attachment apparatus, that can be utilized in the aircraft engine of FIG. 1.
Figure 7:
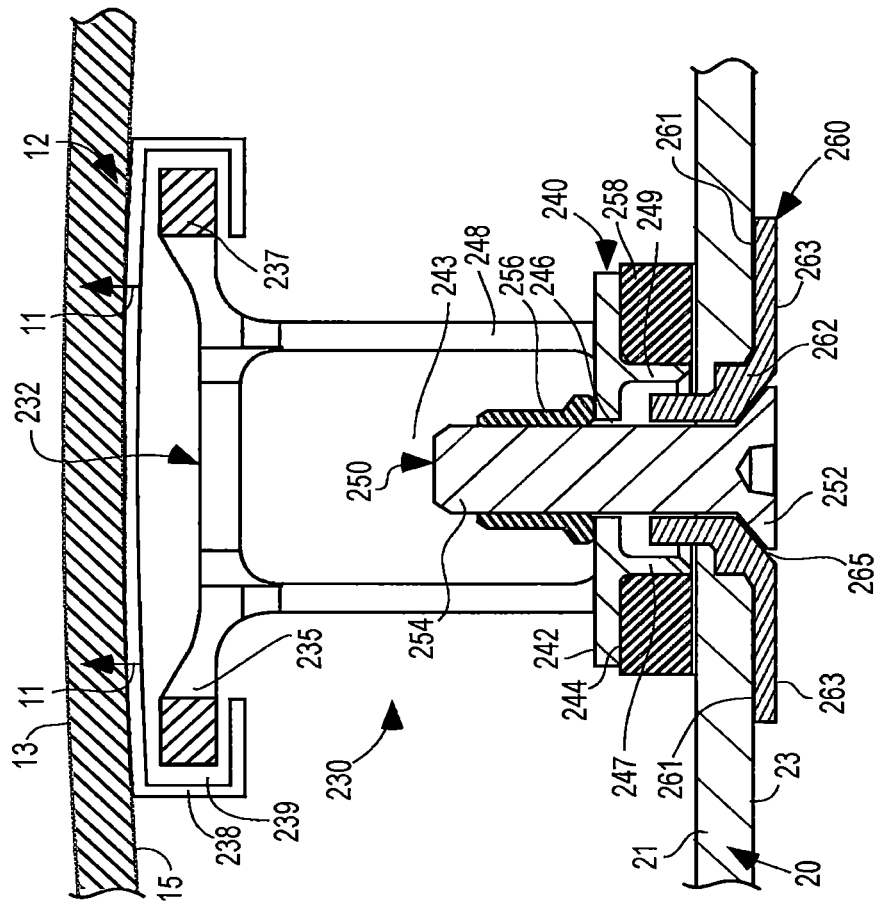
FIG. 7 is a partial cross-section elevational view of the attachment apparatus of FIG. 6.

With reference to FIGS. 3-4, when the heads 52 of the fasteners 50 are at least in part seated within the aperture 65 of the backer plate 60, the abutment of the heads 52 of the fasteners 50 with the first 63 of the backer plate 60, and the abutment of the second 61 of the backer plate 60 with the interior-facing surface 23 of the second component 20 create a more even load distribution in response to a primary load (the exemplary direction of which is shown by way of arrows 11 in FIGS. 3, 5, and 7) and resistance to possible movement of the fasteners 50 in response to the forces of the primary load through the thickness of the second component 20, providing point-load/buckling support and facilitating a more secure attachment of the attachment apparatus 30 to the second component 20.

As can be seen in FIG. 3, the backer plate 60 is countersunk in such that heads 52 of the fasteners 50 are recessed relative to the first surface 63 of the backer plate 60 such that no portion of the heads 52 of the fasteners 50 protrudes inwardly relative to the interior-facing surface 23 of the second component 20. The recessed arrangement of the heads 52 of the fasteners 50 within the aperture 65 of the backer plate 60 advantageously keeps the metallic heads 52 of the fasteners 50 from direct impingement of the high temperature exhaust gases that may be present within the exhaust, nozzle 10 or another compartment of an aircraft engine, thereby protecting the heads 52 from thermal expansion and/or deformation and causing less flow path disruption through the interior 14 of the exhaust nozzle 10. In some embodiments, the overall low profile (i.e., low overall thickness) of the backer plate 60, in combination with the use of the smaller-size fasteners 50 adapted for being countersunk within the aperture 65 of the backer plate 60 advantageously results in a backer plate design that is aerodynamic and provides a less observable electromagnetic effect.

FIG. 5 illustrates another non-limiting example of an attachment apparatus 130 (also referred to herein as "an attachment hanger" or simply "hanger") for attaching a second component 20 (which may be made, for example, of CMC, PMC, or the like) to a (metallic or non-metallic) first component 12. The attachment apparatus 130 is configured for attaching a protective material (e.g., a CMC liner, PMC liner, or the like) to a material intended to be protected (which may be a metallic/non-metallic duct of an exhaust nozzle of an aircraft engine, or another metallic/non-metallic aircraft component, or a metallic/non-metallic component of a non-aircraft vehicle) and has an overall construction that is generally similar to that of the attachment apparatus 30 described above, with some differences highlighted below. For ease of reference, structural aspects of the attachment apparatus 130 that are similar to aspects of the attachment apparatus 30 described above with reference to FIGS. 2-4 have been designated in FIG. 5 with similar reference numbers, but prefaced with a "1."

Similarly to the backer plate 60, the backer plate 160 includes an aperture 165 and may be made of a metallic or non-metallic (e.g., ceramic composite, polymer composite, or the like) material. Similarly to the backer plate 60, the backer plate 160 restricts/prevents the heads 152 of the fasteners 150 from being pulled through the thickness of the second component 20 in an outwardly direction in response to a primary load (the exemplary direction of which is shown by way of arrows 11 in FIG. 5, and which may occur, e.g., as a result of thermal expansion).

Unlike the backer plate 60, the backer plate 160 does not-include recessed portions akin to the recessed portions 62, 64 of the backer plate 60. Instead, the backer plate 160 may be substantially planar having a first surface 163 and a second surface 161, opposite the first surface. It will be understood that the first surface 163 and the second surface 161 can be parallel to each other along their lengths. The backer plate 160 can be considered generally planar even if a first surface 163 may be at least in part curved to complement the curvature of the interior-facing surface 23 of the second component 20. Without wishing to be limited to theory, the backer plate 160 is less sensitive to thermal expansion-induced distress and possible misalignment of the fasteners 50 than the backer plate 60.

As can be seen in FIG. 5, the fasteners 150 have a protruding configuration, where the heads 152 of the fasteners 150 protrude beyond the backer plate 160 and into the flow path within the interior 14 of the exhaust nozzle 10. To that end, the fasteners 150 may be different from the fasteners 50 described above. For example, in the embodiment shown in FIG. 5, the head 152 of each fastener 150 includes a narrower portion 153 and an expanded portion 155, with the expanded portion 155 having a larger diameter than the narrower portion 153 and providing a more secure/larger surface area attachment of the head 152 of the fastener 150 to the inwardly-facing surface of the second component 20.

Figure 6:
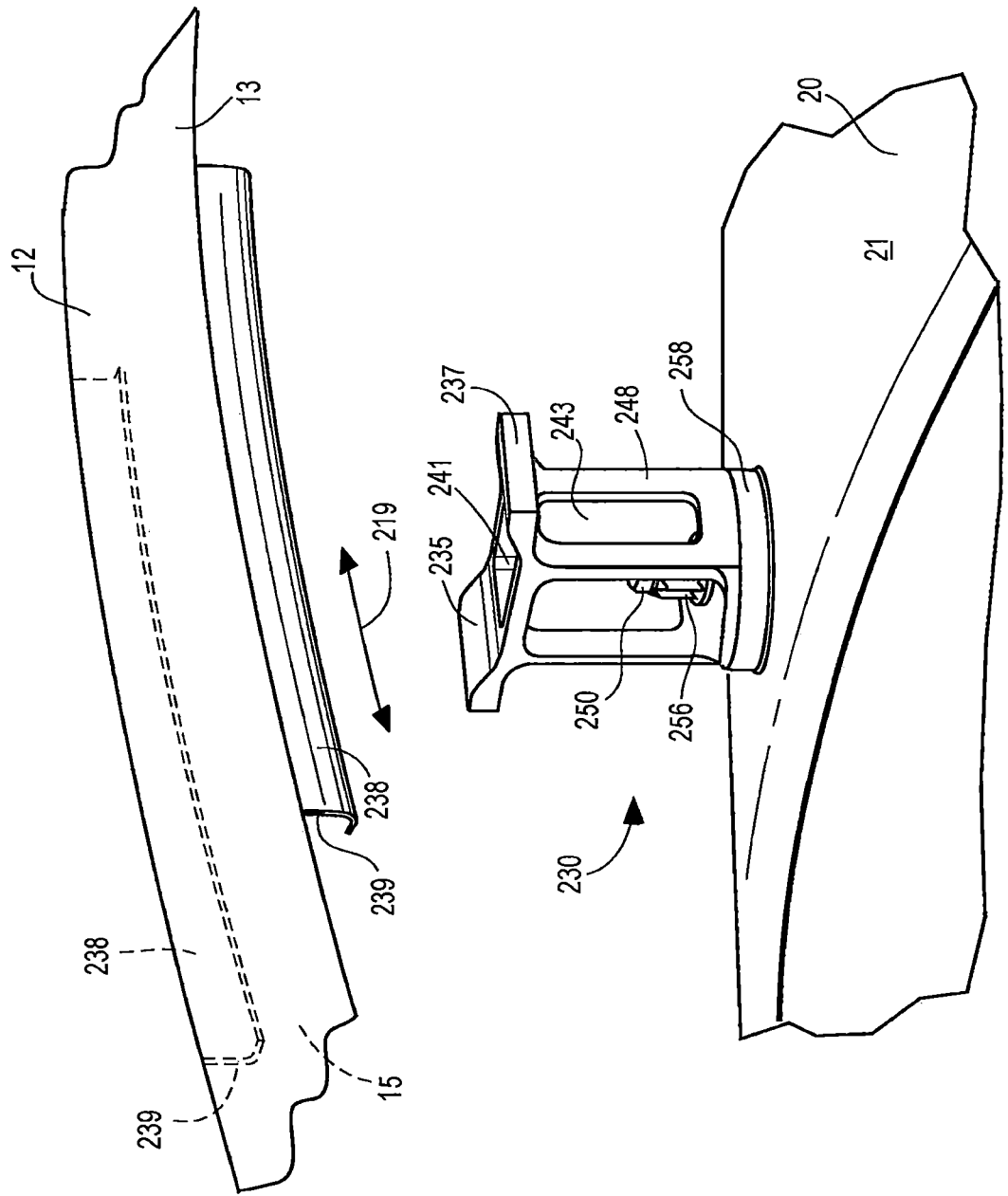
FIG. 6 is a perspective side view of another exemplary attachment apparatus, that can be utilized in the aircraft engine of FIG. 1 with a section exploded.

FIGS. 2-5 above depict non-limiting examples of attachment hangers 30, 130 that are configured to be secured to the second component 20 via two fasteners 50, 150. FIG. 6 illustrates a non-limiting exemplary attachment apparatus 230 utilizing one fastener 250. Again, for ease of reference, structural aspects of the attachment apparatus 230 that are similar to aspects of the attachment apparatus 30 described above with reference to FIGS. 2-4 have been designated in FIG. 5 with similar reference numbers, but prefaced with a "2."

In the illustrated embodiment, the attachment apparatus 230 includes a mounting member 232. The mounting member 232 may be considered a contoured plate. As illustrated, the mounting member 232 includes a first shoulder 235 and a second shoulder 237, with an opening 241 located within a generally centralized portion of the mounting member. In the embodiment shown in FIG. 7, the shoulders 235, 237 of the mounting member 232 are coupled relative to the (metallic/non-metallic) first component 12 via a coupling member 238 (e.g., a track, a clip, or the like) attached (e.g., via welding or the like) to the inwardly-facing surface 15 of the first component 12.

In certain aspects, the track or clip 238 is generally C-shaped to define a channel 239 that receives the shoulders 235, 237 of the mounting member 232 and permits the shoulders 235, 237 of the mounting member 232 to slide axially in two directions (which are illustrated by arrows 17 in FIG. 1) therein. As such, when the second component 20 is attached to the first component 12 via the attachment apparatus 230, the slidable engagement of the mounting member 232 and the track or clip 238 attached to the first component 12 provides some freedom of movement to the mounting member 232 (in the directions indicated by the double arrow 219 in FIG. 6) within the channel 239, advantageously accommodating for possible thermal expansion of the first component 12 and/or the second component 20.

In the embodiment shown in FIGS. 6-7, the attachment apparatus 230 further includes an attachment member 240 opposite the mounting member 232. It will be understood that a plurality of support posts 248 are included in the attachment apparatus. In the illustrated example, at least two support posts are shown. Each of the support posts 248 includes an opening or space 243, which may effectively reduce an overall weight of the support posts 248 and the attachment apparatus 230. It will be appreciated that any number of support posts 248 may be used.

Figure 8:
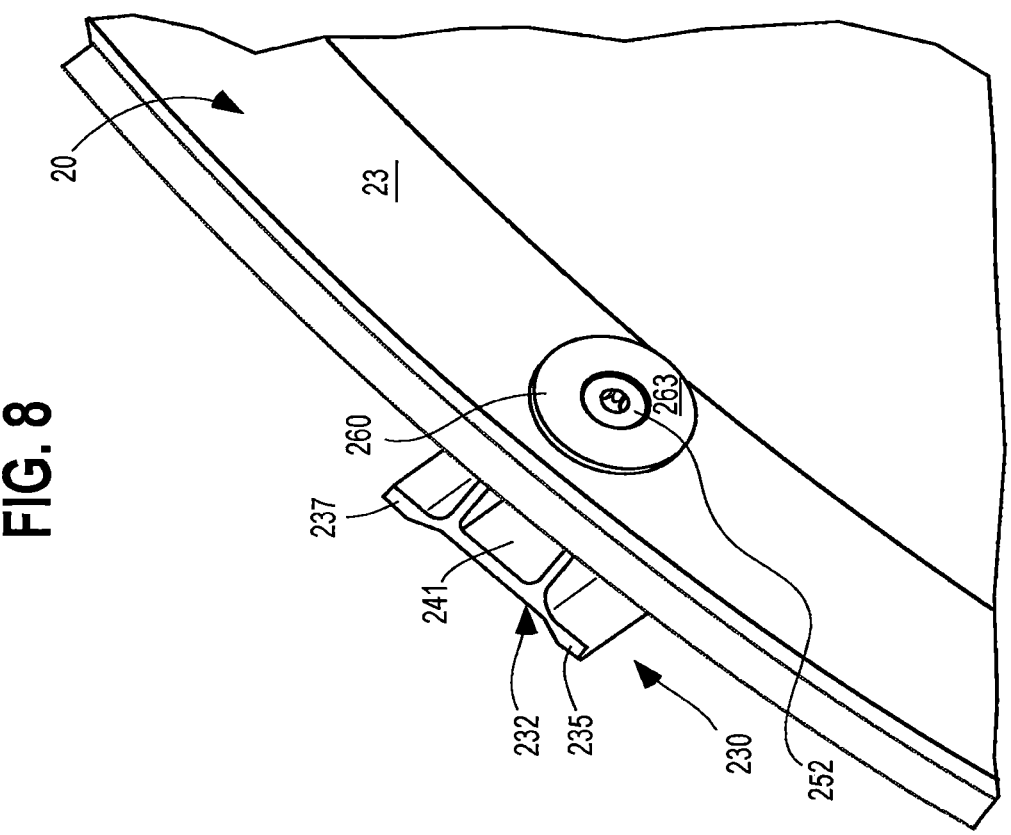
FIG. 8 is a bottom view showing an interior-facing surface of the backer plate and the partially installed attachment apparatus of FIG. 8.

The attachment member 240 has an outwardly-facing or first surface 242 and an inwardly-facing or second surface 244. The attachment member 240 further includes an opening 246 that extends through the thickness of the attachment member 240 from the first surface 242 and the second surface 244 to permit the shaft 254 of the fastener 250 to pass through the attachment member 240, as shown in FIGS. 7-8. In some embodiments, the attachment member 240 may include two flange-like self-alignment members 247, 249 extending from the second surface 244. In the embodiment shown in FIG. 7, the self-alignment members 247, 249 are located between the attachment member 240 of the attachment apparatus 230 and a recessed portion 262 of the backer plate 260, providing room for the thermal spacer 258 and providing a mechanism for ensuring proper alignment between the attachment apparatus 230 and/or the backer plate 260 during installation.

Given the possible thermal expansion of the first component 12 and/or the second component 20, and given that the second component 20 made of CMC/PMC material would not be as not as strong in the through-thickness direction as a second component that is metallic would be, to prevent the head 252 of the fastener 250 to be pulled in response to the primary load (shown by arrows 11 in FIG. 7) outwardly through the thickness of the second component 20 (e.g., as a result of thermal expansion), the attachment apparatus 230 illustrated in FIGS. 7 and 8 advantageously includes a backer plate 260 including an aperture 265 configured, to permit a portion (e.g., the threaded shaft 254 of the fastener 250) to pass therethrough.

As shown in FIG. 6-8, when assembled, the head 252 of the fastener 250 securely attaches the outwardly-facing or first surface 261 of the backer plate 260 to the interior-facing surface 23 of the second component 20. In addition, the shaft 254 of the fastener 250 (at least a portion of which is threaded) passes through the second component 20 and through the opening 246 in the attachment member 240, being attached relative to the attachment member 240 by a nut 256 (which may be a self-locking nut), which secures both the attachment member 240 and the backer plate 260 relative to the second component 20.

As shown in FIGS. 6-7, the nut 256 may be tied onto the first surface 242 of the attachment member 240, with the second surface 244 of the attachment member 240 being in turn tied down (by the force exerted by the tying down of the nut 256) onto a thermal spacer 258 (through which the shaft 254 of the fastener 250 passes). As mentioned above, the thermal spacer 258 may be made from alloys specifically selected to have a relatively high thermal expansion coefficient to make up for the relatively low thermal expansion coefficient of the second component 20. In other words, in the configuration of FIG. 7, the thermal spacer 258 is located between the second surface 244 of the attachment member 240 and the outwardly-facing surface 21 of the second component 20. It will be appreciated that a Belleville washer may be used instead of the thermal spacer 258 in certain implementations. The use of the thermal spacer 258 may accommodate for possible thermal expansion of the second component 20 and/or the fastener 50, keeping the attachment of the backer plate 260 and the attachment member 240 to the protective liner 20 more secure.

In the illustrated embodiment, the backer plate 260 has a countersunk configuration that includes a recessed portion 262, which is recessed (in an outwardly direction) relative to the inwardly-facing or first surface 263 (which is opposite the outwardly-facing or second surface) of the backer plate 260, forming a seat for the head 252 of the fastener 250 when the fastener 250 is secured to the backer plate 260, thereby securely attaching the backer plate 260 to the interior-facing surface 23 of the protective liner 20.

The backer plate 260 may be made of a metallic or non-metallic (e.g., ceramic composite, polymer composite, or the like) material. The backer plate 260 of FIG. 7 has a different exterior contour as compared to the exterior contour of the backer plate 160 of FIG. 5. In addition, while no portion of the backer plate 160 is recessed into and passes through the aperture in the second component 20, a portion of the backer plate 260, namely, the recessed portion 262, passes through a portion of the aperture in the second component 20 (notably, portions of the head 252 and the shaft 254 of the fastener 250 also pass through a portion of this aperture in the second component 20). Without wishing to be limited to theory, the use of the backer plate 260 to secure the attachment member 240 of the hanger 230 to the protective liner 20 restricts/prevents the head 252 of the fasteners 250 from being pulled through the thickness of the second component 20 in response to the primary load (shown by arrows 11 in FIG. 7) in an outwardly direction (e.g., as a result of thermal expansion). As can be seen in FIG. 8, the backer plate 260 may have a generally circular exterior contour, but it will be appreciated that the backer plate 260 may be generally rectangular or ellipsoid/oval (with both curved and straight portions) in certain embodiments. As pointed out above, it will be appreciated that the backer plate 260 may be deliberately shaped in various configurations to increase the load bearing area or to decrease the load-bearing area, depending on the needs of a particular installation.

With reference to FIGS. 7-8, when the head 252 of the fastener 250 is seated within the recessed portion 262 of the backer plate 260, the abutment of the head 252 of the fastener 250 with the first surface 263 of the backer plate 260, and the abutment of the second surface 261 of the backer plate 260 with the interior-facing surface 23 of the second component 20 create a more even load distribution and resistance to possible movement of the shaft 254 and head 252 of the fastener 250 in response to the primary load (shown by arrows 11 in FIG. 7) in an outwardly direction through the second component 20, thereby providing point-load/buckling support and facilitating a more secure attachment of the attachment apparatus 230 to the second component 20.

As can be seen in FIG. 7, the backer plate 260 is countersunk in that head 252 of the fastener 250 is recessed relative to the first surface 263 of the backer plate 260 such that no portion of the head 252 of the fastener 250 protrudes inwardly relative to the first surface 23 of the second component 20, making the attachment apparatus 230 more aerodynamic overall. In addition, the recessed arrangement of the head 252 of the fastener 250 within the recessed portion 262 of the backer plate 260 advantageously keeps the metallic head 252 of the fastener 250 protected from direct impingement of the high temperature exhaust gases passing through the interior 14 of the exhaust nozzle 10, thereby advantageously preventing possible deformation of the head 252 and/or causing less flow path disruption through the interior 14 of the exhaust nozzle 10. Alternatively, the backer plate 260 may be a non-countersunk configuration (akin to the configuration of the backer plate 160 of FIG. 5), where the backer plate 260 does not include a recessed portions akin to the recessed portion 262, but instead has planar, non-recessed straight or curved first and second surfaces 261 and 263.

Figure 9:
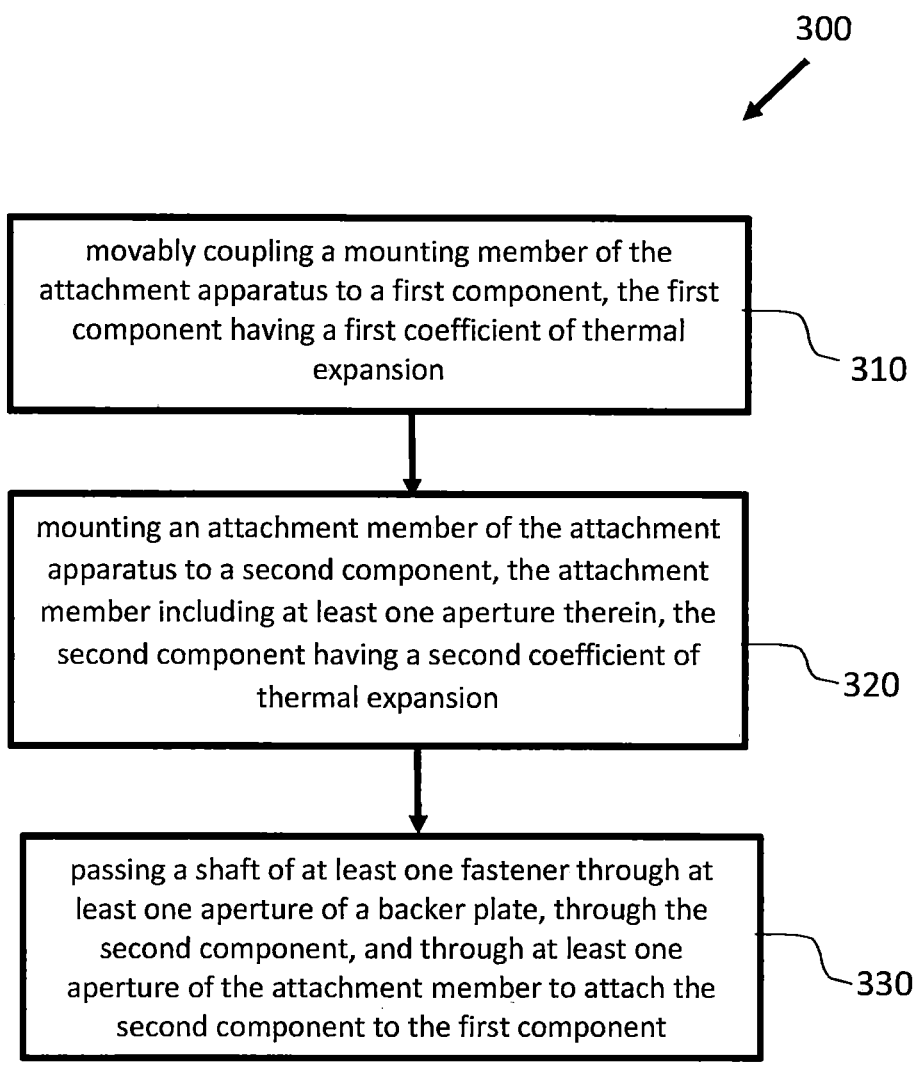
FIG. 9 is a flow chart diagram of an exemplary process of attaching two components having different coefficients of thermal expansion.

With reference to FIG. 9, an exemplary method 300 of attaching a second component (e.g., a protective material) to a first component (e.g., metallic/non-metallic aircraft component or a non-aircraft component), where the first and second components have different coefficients of thermal expansion will now be described. For exemplary purposes, the method 300 is described in the context of attaching the attachment apparatus 30 described with reference to FIGS. 2-4 to the second component 20 and to the first component 12, thereby attaching the second component 20 to the first component 12, but it will be understood that embodiments of the method 300 may be implemented to attach various other embodiments of the attachment apparatuses 130 (FIG. 5) and 230 (FIGS. 6-8) to the first component and the second component 20.

In the illustrated embodiment, the method 300 of attaching two components having different coefficients of thermal expansion includes movably coupling a mounting member 32 of the attachment apparatus 30 to a first component 12, the first component 12 having a first coefficient of thermal expansion (step 310). As pointed out above, a track or clip 38 mounted to the first component 12 may include a channel 39 that receives at least a portion of the mounting member 32 and permits the mounting member 32 to slide axially therein in two directions (shown via two-directional arrows 17 in FIG. 1).

The method further includes mounting an attachment member 40 of the attachment apparatus 30 to a second component 20 having a second coefficient of thermal expansion (step 320). As pointed out above, the attachment member 40 includes one or more apertures 46 therein that extend through the full thickness of the attachment member 40 and permit a shaft 54 of a fastener 50 to pass through the attachment member 40.

The method 300 further includes passing a shaft 54 of at least one fastener 50 through at least one aperture 65 of the backer plate 60, through the second component 20, and through at least aperture 46 of the attachment member 40 (step 330). The apertures 65 of the backer plate 60 extend through the full thickness of the backer plate 60 to permit the shaft 54 of a fastener 50 to pass through the backer plate 60. As pointed out above, depending on the intended application, the backer plate 60 may be deliberately shaped in various shapes and sizes to both increase the load bearing area (i.e., when the backer plate 60 is contoured to be of a maximum overall size suitable for a given installation) and reduce the electro-magnetic signature of the backer plate 60 (i.e., when the backer plate 60 is contoured to be of a minimum overall size suitable for a given installation).

As described in more detail above, in some embodiments, the backer plate 60 may have a countersunk configuration including first and second recessed portions 62, 64 that are recessed relative to the interior-facing surface 23 of the second component 20 and define seats for the heads 52 of the fasteners 50, and enable the heads 52 of the fasteners to be recessed relative to the inwardly-facing surface 63 of the backer plate 60, such that no portion of the heads 52 of the fasteners 50 protrudes inwardly relative to the interior-facing surface 23 of the second component 20. Alternatively, the backer plate 160 may be constructed in a non-countersunk configuration, where the backer plate 160 does not include recessed portions that extend into the inwardly-facing surface 23 of the second component 20 akin to the recessed portions 62, 64 of the backer plate 60. In some embodiments, the attachment apparatus 30, 130 may be configured such that the backer plate 60, 160 and the attachment member 40, 140 of the attachment apparatus 30, 130 are attached to the second component 20 via two fasteners 50, 150, while in other embodiments, the attachment apparatus 230 may be configured such that the backer plate 260 and the attachment member 240 of the attachment apparatus 230 are attached to the second component 20 via one fastener 250.

Without wishing to be limited to theory, the embodiments of the attachment apparatus described herein are easy and cost-effective to manufacture and easy to install, and provide more even load distribution of force exerted by the fastener(s) onto the second component 20 as a result of mechanical loads and thermal expansion that may occur during operation of an engine (e.g., an aircraft engine), thereby advantageously providing buckling support and resistance to possible movement of the fasteners 50 in an outwardly direction through the second component 20, thereby facilitating a more secure and longer-life-cycle attachment of the attachment apparatuses 30 to the second component 20 and, in turn, a more secure and longer-life-cycle attachment of the second component 20 (e.g., CMC liner, PMC liner, or the like) to the first component 12 (e.g., metal or metal alloy duct of an exhaust nozzle 10 of an engine).

Further aspects of disclosure are provided by the subject matter of the following clauses:

There is provided an attachment apparatus, comprising: a mounting member configured to be movably coupled relative to a first component having a first coefficient of thermal expansion; an attachment member mountable to a second component having a second coefficient of thermal expansion, the attachment member including at least one aperture therein; at least one support post interconnecting the mounting member and the attachment member; a backer plate including at least one aperture having a first diameter; and at least one fastener having a shaft and a head. When assembled, the shaft passes through the at least one aperture of the backer plate, through the second component, and through the at least one aperture of the attachment member to attach the second component to the first component. The head of the at least one fastener has a second diameter that is larger than the first diameter of the at least one aperture of the backer plate.

The apparatus may include a track or clip attached to the first component and configured to define a channel that permits the mounting member to slidably move therein in two directions.

The mounting member, the attachment member, and the at least one support post of the attachment apparatus may be a single unitary monolithic body. At least one of the mounting member or the attachment member may be a plate. The plate may be a contoured plate including an aperture therein.

The at least one post of the apparatus may be a singular post. At least a portion of the at least one post may include a cutout to reduce a total weight of the at least one post.

When the apparatus is in use, a primary load direction may be perpendicular to the mounting member, the attachment member, and the backer plate.

The backer plate may be contoured. The backer plate may have a first surface and a second surface, the second surface opposite the first surface and wherein the at least one aperture is recessed from the first surface. When the apparatus is assembled, the head of the at least one fastener may be flush with the first surface of the backer plate. Alternatively, when the apparatus is assembled, the head of the at least one fastener may protrude inwardly relative to the first surface of the backer plate.

The second component may include an aperture configured to permit the at least one fastener to pass therethrough. A portion of the backer plate may pass through at least a portion of the aperture of the second component.

The backer plate may be made of a material having a third coefficient of thermal expansion that is different from the second coefficient of thermal expansion.

The at least one fastener may be two fasteners, and the at least one aperture of the backer plate may include two apertures to permit the two fasteners to pass therethrough and pass through the second component and through the attachment member.

The apparatus may further include at least one nut configured to engage the shaft of the at least one fastener and secure the at least one fastener relative to the attachment member; and at least one thermal spacer secured relative to the attachment member. The at least one thermal spacer may be positioned between the at least one nut and the attachment member. The attachment member may be positioned between the at least one nut and the at least one thermal spacer and the at least one thermal spacer may be positioned between the attachment member and the second component.

A system for attaching the second component to the first component is also provided. In the system, the first component is an aircraft engine component and the second component is a protective liner configured to protect the first component. The system includes a plurality of attachment apparatuses identical to the attachment apparatus of claim 1, and the attachment apparatuses are spaced from one another and movably coupled relative to the aircraft engine component and mounted to the protective liner to attach the protective liner to an inwardly-facing surface of the aircraft engine component such that the protective liner fully covers the inwardly-facing surface of the aircraft engine component. The first component of the system may be a metallic material and the second component of the system may be a ceramic material.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. An attachment apparatus, comprising:
 a mounting member movably coupled relative to a first component having a first coefficient of thermal expansion;
 an attachment member mounted to a second component having a second coefficient of thermal expansion, the attachment member including at least one aperture therein;
 at least one support post interconnecting the mounting member and the attachment member;
 a backer plate including at least one aperture having a first diameter;
 at least one fastener having a shaft and a head; and
 at least one nut threadably engaging threads of the shaft of the at least one fastener and securing the at least one fastener relative to the attachment member;
 wherein the shaft passes through the at least one aperture of the backer plate, through the second component, and through the at least one aperture of the attachment member to attach the second component to the first component; and
 wherein the head of the at least one fastener has a second diameter that is larger than the first diameter of the at least one aperture of the backer plate.

2. The apparatus of claim 1, further comprising a track or clip attached to the first component and configured to define a channel that permits the mounting member to slidably move therein in two directions.

3. The apparatus of claim 1, wherein the mounting member, the attachment member, and the at least one support post are a single unitary monolithic body.

4. The apparatus of claim 1, wherein at least one of the mounting member or the attachment member is a plate.

5. The apparatus of claim 4, wherein the plate is a contoured plate including an aperture therein.

6. The apparatus of claim 1, wherein at least a portion of the at least one support post includes a cutout to reduce a total weight of the at least one support post.

7. The apparatus of claim 1, wherein, when the apparatus is in use, a primary load direction is perpendicular to the mounting member, the attachment member, and the backer plate.

8. The apparatus of claim 1, wherein the backer plate is contoured.

9. The apparatus of claim 8, wherein the backer plate has a first surface and a second surface, the second surface opposite the first surface and wherein the at least one aperture is recessed from the first surface.

10. The apparatus of claim 9, wherein the head of the at least one fastener is flush with the first surface of the backer plate.

11. The apparatus of claim 1, wherein the second component includes an aperture configured to permit the at least one fastener to pass therethrough, and wherein a portion of the backer plate passes through at least a portion of the aperture of the second component.

12. The apparatus of claim 1, wherein the backer plate is made of a material having a third coefficient of thermal expansion that is different from the second coefficient of thermal expansion.

13. The apparatus of claim 1, further comprising:
at least one thermal spacer secured relative to the attachment member.

14. The apparatus of claim 13, wherein the at least one thermal spacer is positioned between the at least one nut and the attachment member.

15. The apparatus of claim 13, wherein the attachment member is positioned between the at least one nut and the at least one thermal spacer and the at least one thermal spacer is positioned between the attachment member and the second component.

16. A system for attaching the second component to the first component, wherein the first component is an aircraft engine component, and wherein the second component is a protective liner configured to protect the first component, the system comprising a plurality of attachment apparatuses identical to the attachment apparatus of claim 1, wherein the attachment apparatuses are spaced from one another and movably coupled relative to the aircraft engine component and mounted to the protective liner to attach the protective liner to an inwardly-facing surface of the aircraft engine component such that the protective liner fully covers the inwardly-facing surface of the aircraft engine component.

17. The system of claim 16, wherein the first component is a metallic material and the second component is a ceramic material.

* * * * *